United States Patent

[11] 3,570,634

[72] Inventor: Takekazu Yamamoto, Kariya City, Aichi, Japan
[21] Appl. No.: 834,386
[22] Filed: June 18, 1969
[45] Patented: Mar. 16, 1971
[73] Assignee: Aisin Seiki Company Limited, Kariya City Aichi Pref, Japan
[32] Priority: June 25, 1968
[33] Japan
[31] 43/54304

[54] HYDRAULIC BRAKE ASSEMBLY FOR AUTOMOBILES
4 Claims, 3 Drawing Figs.

[52] U.S. Cl. ................................................. 188/152
[51] Int. Cl. ................................................. B60t 11/30
[50] Field of Search .................................. 188/152.14, .873, .81

[56] References Cited
UNITED STATES PATENTS
2,611,387  9/1952  Legerski ............... (188/152.14)ux
FOREIGN PATENTS
257,390  10/1967  Austria .................. 188/152(.873)
905,025  9/1962  Great Britain .......... 188/152(.81)

Primary Examiner—George E. A. Halvosa
Attorney—Pierce, Scheffler & Parker

ABSTRACT: Hydraulic brake assembly for automobiles, wherein two channels for fluid supply and air expelling are arranged in a lug of the cylinder. The fluid entering through the liquid supply channel expels any air from the cylinder bore through the air-expelling passage.

INVENTOR
Takekazu Yamamoto

BY Pierce, Schiffler & Parker
ATTORNEYS

HYDRAULIC BRAKE ASSEMBLY FOR AUTOMOBILES

BACKGROUND OF THE INVENTION

This invention relates to hydraulic brake assemblies for automobiles. More particularly, the invention concerns a new and improved hydraulic brake assemblies in which the wheel cylinder having a piston therein and a lug portion integral therewith is mounted on a backing plate and slidable in the direction of the longitudinal axis of the piston, the piston being slidable in the opposite direction to apply the brake by means of fluid under pressure.

It is well known the actuator cylinder integral with the lug wherein the air bleed channel and the liquid inlet channel extend from the outer end face of the lug to the interior of the cylinder. The two channels are positioned relative one to the other with their inner ends placed adjacent circumferentially of the inner surface of the cylinder while their outer ends are placed substantially on a line normal to a radius line of the cylinder or normal to a radius line of the backing plate.

SUMMARY OF THE INVENTION

The object of the present invention is to provide a brake assembly in which any air in the cylinder can be easily and completely removed.

Another object of this invention is to provide a brake assembly in which the channels for air expelling from, and liquid supply to, the cylinder are so arranged that the lug can be made substantially thinner than heretofore; and consequently the mounting slot in the backing plate can be narrower than heretofore.

A further object of this invention is to provide a hydraulic brake assembly which can be easily and economically manufactured.

According to the present invention, briefly summarized, there is provided a brake cylinder integral with the lug and having two channels for the air expelling and fluid inlet therein. The two channels are positioned in the same plane vertical to the backing plate and passing through the longitudinal axis of the cylinder. The nature, principles, details, and utility of the invention will be more clearly apparent from the following detailed description with respect to an example of a preferred embodiment of the invention when read in conjunction with the accompanying drawings.

DETAILED DESCRIPTION

Figure 1:
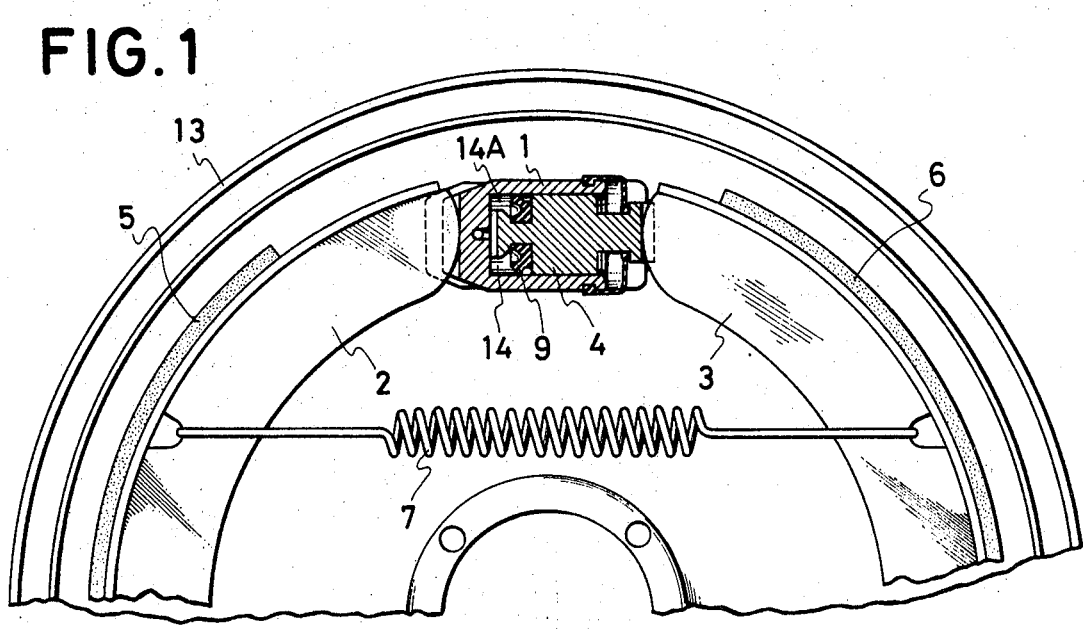
FIG. 1 is a partially sectioned side elevation of the hydraulic brake cylinder assembly according to the present invention, the section passing through the axis of the operating cylinder parallel to the backing plate.

In FIG. 1 there is partially shown a brake assembly of the drum type which comprises an operating cylinder 1, two brake shoes 2, 3 operatively connected to the cylinder 1 and a single piston 4 in the cylinder 1 respectively, two brake linings 5, 6 rigidly mounted on the shoes 2, 3 and a return spring 7 provided between the two shoes 2, 3.

The piston 4, slidably mounted in a bore 8 of cylinder 1, has a smaller diameter part 4A, a head portion 4B, an extreme portion 4C and a body portion 4D. The diameter of head portion 4B is larger than that of part 4A, and smaller than that of body 4D. Between head portion 4B and body portion 4D, and around part 4A, there is formed an annular groove 19 in which a piston cup 9 forming a loop recess 10 is provided for effectively receiving fluid under pressure. The piston cup 9 is made of an elastic material such as rubber for assuring an effective seal between an inner wall 11 of cylinder 1 and piston 4, also. The head portion 4B is beveled at 4B' so that any air in recess 10 may be completely expelled.

Figure 3:
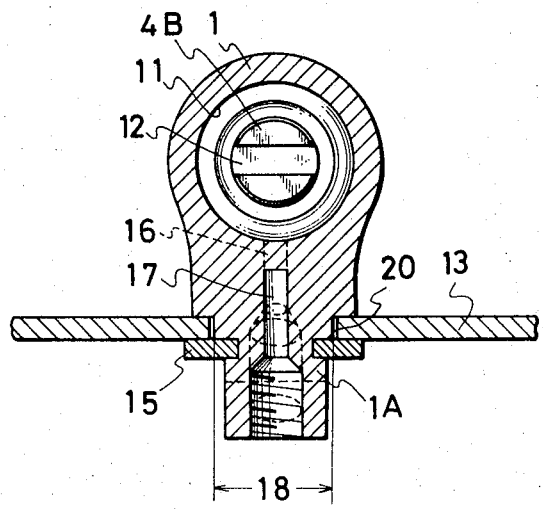
FIG. 3 is a view in cross section of this brake cylinder assembly taken along the line III–III of FIG. 2.

Another groove 12 is formed transversely across the end face of the head 4B from one edge thereof to the other in parallel relationship with a backing plate 13 as clearly shown in FIG. 3.

Figure 2:
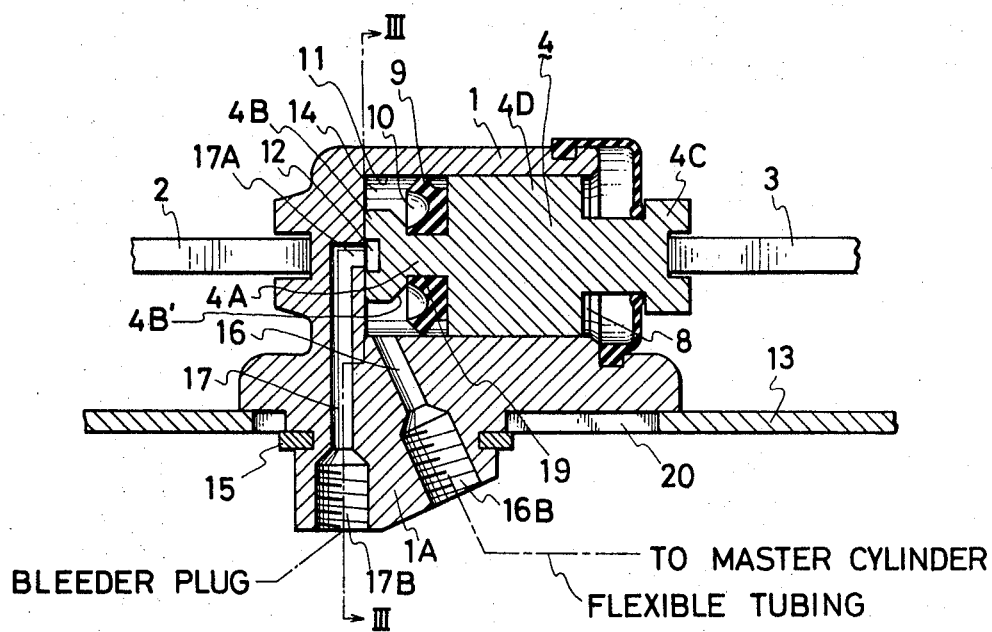
FIG. 2 is a sectioned and enlarged plane view of FIG. 1, the section passing through the axis of the cylinder vertical to said backing plate.

The brake shoe 3 abuts against the extreme portion 4C of the piston 4 which is fork-shaped as shown in FIG. 2. The operating cylinder 1 which is fork-shaped at its end abuts against to the other shoe 2. The numeral 14 denotes a fluid chamber formed in bore 8 by piston 4, piston cup 9 and inner wall 11 of the cylinder 1. As shown in FIG. 1 the chamber 14 occupies its upper position at 14A when the hydraulic brake assembly has been assembled.

On cylinder 1 there is integrally formed a lug portion 1A which is slidably mounted on backing place 13 and projects through a slot 20 of plate 13 as shown in FIGS.2 and 3, lug 1A being prevented by a snapring 15 from withdrawal through slot 20.

The thickness 18 of lug 1A, that is, the thickness of slot 20 in backing plate 13 is desired to be manufactured as narrow as possible, because the dimension of slot 20 of plate 13 is limited by an adjuster (not shown) for adjusting clearance between brake linings 5, 6 and a brake drum (not shown), and by the return spring 7 provided between the two brake shoes 2, 3.

In lug 1A, there are arranged two channels 16, 17 for fluid supply and air expelling. One channel 16 which is for fluid supply connects inner wall 11 of cylinder 1 to the outer end 16B thereof and communicates with a master cylinder (not shown) through a flexible tubing (not shown) attached to the outer end 16B. The other channel 17 for air bleed penetrates into lug 1A substantially perpendicularly to backing plate 13. One end 17A of channel 17 is turned so as to be substantially parallel to plate 13 and to communicate with the center of groove 12 as in the end face of the piston 4 when the piston head contacts the cylinder wall at the end of the bore as shown in FIG. 2. The other end 17B thereof is usually plugged. The fluid inlet channel 16 is arranged in the same plane as the air bleed channel 17, this plane being perpendicular to backing plate 13 and passing through longitudinal axis of cylinder 1; consequently lug 1A can be manufactured with a minimum thickness.

When the air bleed is desired, the plug is detached from the other end 17B of air-expelling channel 17 and the fluid is supplied to chamber 14 and loop recess 10 through liquid inlet passage 16. Any air in chamber 14 recess 10 is led by means of fluid to air-expelling channel 17 through the other groove 12 and one end 17A of channel 17.

The other groove 12 is formed to be parallel with backing plate 13 as shown in FIG. 3, so that no air remains in chamber 14 and recess 10; the air expelled by liquid is led to the upper part 17A, and then sent out toward the other end 17B of air bleed channel 17 through the other groove 12 and the end 17A.

When the plug is detached from end 17B, the air is expelled with fluid to the outer side of lug 1A.

Thus the arrangement of the two channels according to this invention accomplishes a complete and easy removal of air from the cylinder during an expelling operation, and the greatest economy of the space of the backing plate and the materials in manufacture of the cylinder can be attained.

I claim:

1. A hydraulic brake assembly for automobiles comprising:
   a cylinder body having a bore;
   a piston slidably mounted in said bore and comprising a head portion and a body portion of larger diameter than said head portion;
   an inner chamber constituted in said bore and defined by said piston and cylinder body;
   a transverse groove formed in and extending across the end face of said head portion from one edge thereof to the other, the opposite ends of said groove being in communication with said inner chamber when said piston head portion abuts the cylinder wall a t the end of said bore;

a lug integral with said cylinder body and projecting in a direction generally radially from said body, said lug being provided with fluid supply and air-expelling channels, said fluid supply channel extending from the outer surface of said lug to said inner chamber of said cylinder, the inner end of said air-expelling channel being in alignment with said transverse groove and in communication therewith when said piston head portion abuts the cylinder wall at the end of said bore to bleed off air trapped within outer end of said air expelling channel reaching to the outer surface of said lug; and a brake backing plate slidably mounting said lug, both of said fluid supply and air-expelling channels being positioned in one and the same plane which is perpendicular to said backing plate and which passes through the longitudinal axis of said cylinder.

2. A hydraulic brake assembly as defined in claim 1 and wherein said transverse groove is parallel with said backing plate.

3. A hydraulic brake assembly as defined in claim 1 and which further comprises a piston cup surrounding said piston head and which contacts the wall of the cylinder bore to establish a seal between said piston body and said cylinder bore.

4. A hydraulic brake assembly as defined in claim 3 and wherein said piston head portion is beveled thereby remaining no air in said piston cup when the air-bleeding operation is applied.